United States Patent [19]

Kramer

[11] Patent Number: 4,844,493

[45] Date of Patent: Jul. 4, 1989

[54] REMOTELY-CONTROLLED VEHICLE

[76] Inventor: Dale C. Kramer, R.R. #1, Weaver Road, Port Colborne, Ontario, Canada, L3K 5V3

[21] Appl. No.: 92,297

[22] Filed: Sep. 1, 1987

[30] Foreign Application Priority Data

Sep. 1, 1986 [GB] United Kingdom ............... 8621105

[51] Int. Cl.⁴ ............................................ B60K 27/06
[52] U.S. Cl. ..................... 180/169; 180/6.5; 250/342; 280/DIG. 5
[58] Field of Search ................. 180/6.5, 167, 169; 318/587; 250/308, 342, 345; 280/DIG. 5

[56] References Cited

U.S. PATENT DOCUMENTS

| | | | |
|---|---|---|---|
| 3,472,333 | 10/1969 | Loewenstern, Jr. | 180/167 |
| 3,720,281 | 3/1973 | Frownfelter | 180/169 |
| 3,742,507 | 6/1973 | Pirre | 318/587 |
| 3,812,929 | 5/1974 | Farque | 180/169 |
| 3,856,104 | 12/1974 | Ohba | 180/167 |
| 3,976,151 | 8/1976 | Farque | 180/169 |
| 4,109,186 | 8/1978 | Farque | 180/169 |
| 4,627,511 | 12/1986 | Yajima | 180/167 |
| 4,710,020 | 12/1987 | Maddox et al. | 180/167 |
| 4,757,450 | 7/1988 | Etoh | 180/169 |

*Primary Examiner*—David M. Mitchell
*Attorney, Agent, or Firm*—Sim & McBurney

[57] ABSTRACT

A remotely-controlled vehicle, preferably configured as a golf cart is controlled by two independent driving motors operably connected each to one of the wheels. Signals for operation of the motors are generated by an infra-red signal detecting device, which detects infra-red signals from a remote source being followed by the vehicle. The infra-red signal detecting device includes two detectors which detect the source to the sides of the vehicle and turn the device in that direction by applying a differential speed to the wheels. The infra-red detecting device also includes two detectors which detect the source forwardly of the device at one of three different locations in response to which the speed of the vehicle is controlled.

7 Claims, 5 Drawing Sheets

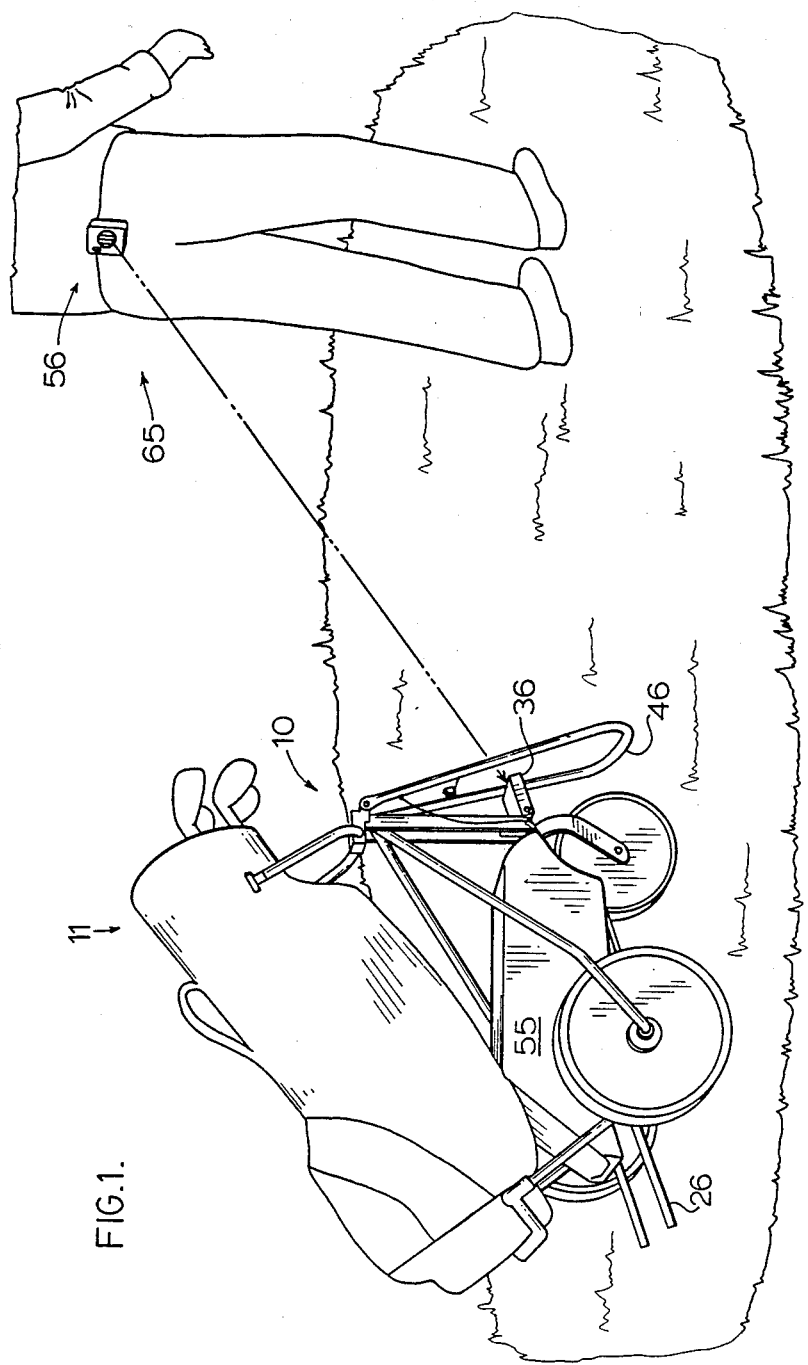

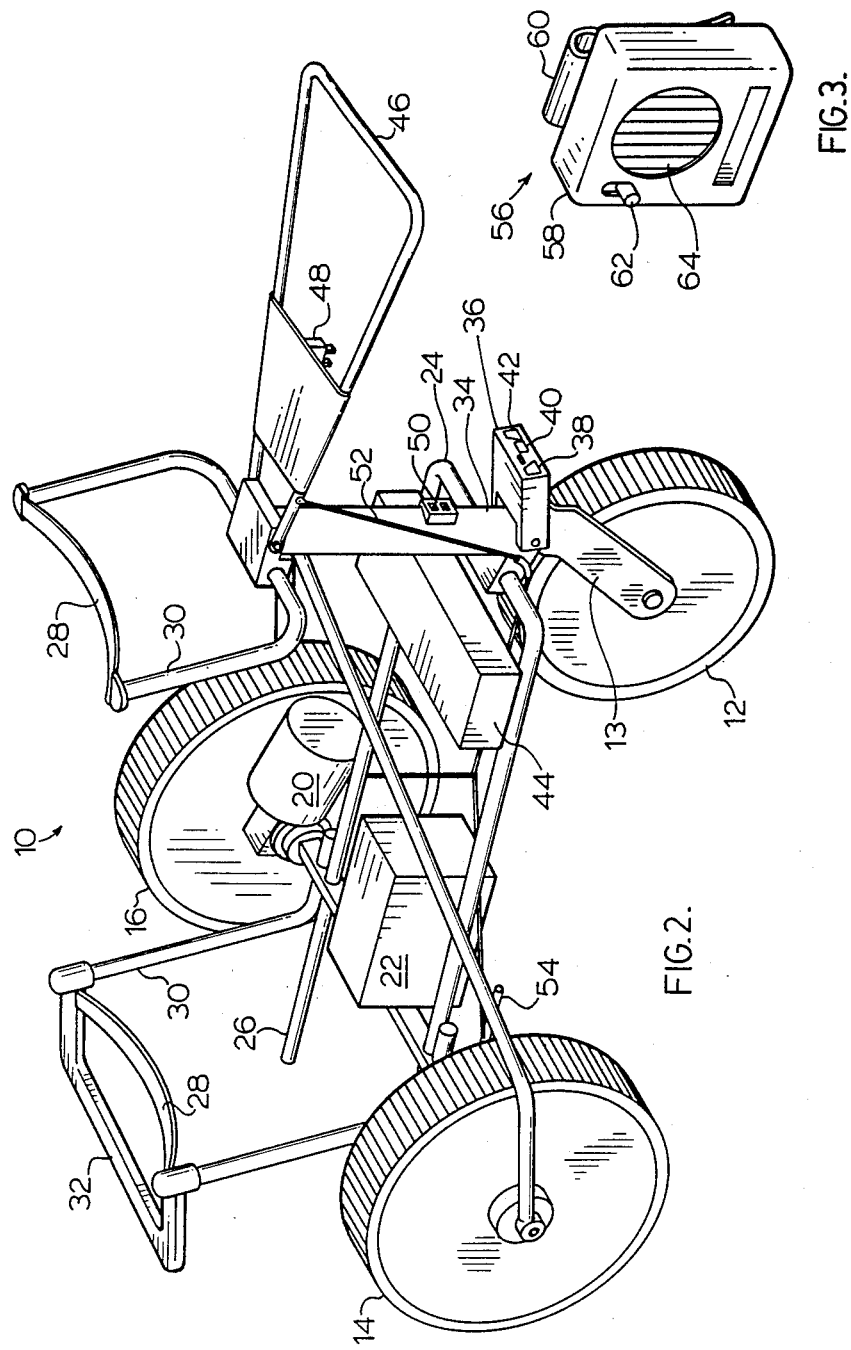

| CODE | COLOUR | PULSE SPACING | BURST SPACING |
|---|---|---|---|
| Y | YELLOW | 100 μs | 16.0 ms |
| B | BLUE | 150 μs | 18.5 ms |
| G | GREEN | 200 μs | 21.0 ms |
| R | RED | 250 μs | 23.5 ms |

REMOTELY-CONTROLLED VEHICLE

FIELD OF INVENTION

The present invention relates to a vehicle that follows a transmitter and maintains a relatively constant separation distance between the vehicle and the transmitter over a range of transmitter speeds. The invention is particularly concerned with golf carts which carry the golfer's club and which follow the golfer around the golf course.

BACKGROUND TO THE INVENTION

It has previously been suggested to provide golf carts which are remotely controlled by the golfer. Representative prior art known to the applicant includes U.S. Pat. Nos. 3,472,333, 3,720,281, 3,742,507, 3,812,929, 3,856,104, 3,976,151 and 4,109,186.

In U.S. Pat. No. 3,472,333, control commands, determined by the golfer, are transmitted by radio signals from an antenna on the transmitter to an antenna on the receiver. U.S. Pat. No. 3,720,281 similarly uses radio signals.

U.S. Pat. No. 3,742,507 similarly relies on radio waves but responds to the strength of the signal to determine its action.

U.S. Pat. Nos. 3,812,929, 3,976,151 and 4,109,186 all use a magnetic antenna system mounted on the vehicle to sense the location and distance of a magnetic signal generating transmitter to provide steering and speed signals to the vehicle.

U.S. Pat. No. 3,856,104 is another arrangement which relies on radio signals from a remote transmitter picked up by a pair of antennas on the golf cart.

As far as the applicant is aware, there has been no suggestion to employ infra-red signals to effect control of golf carts or other vehicles. In addition, each of the prior art devices requires that the transmitter device be switched off, if movement of the vehicle is to cease while the person still moves.

SUMMARY OF INVENTION

In one aspect, the present invention provides a remotely-controlled vehicle capable of responding to infra-red signals received from a remote source and to follow the remote source in accordance with the signals detected.

The vehicle comprises a chassis having at least three wheels and means for driving and controlling the wheels whereby the vehicle may turn to the left or to the right, may proceed straight ahead and may operate at varying speeds.

Receiving means is mounted on the chassis for receiving and interpreting infra-red signals from the remote source by a plurality of infra-red signal detectors. The infra-red signal detectors are arranged to detect the distance of the remote source from the vehicle and to detect whether the remote source is to the left, to the right or directly ahead.

Signal processing means is provided to generate a command signal to the driving and controlling means to cause the vehicle to move in accordance with the infra-red signals detected by the receiving means.

The chassis preferably has just three wheels, two of which are independently driven by separate electrical motors. The driving and controlling means controls the speed of the motors, so as to turn the vehicle by applying a differential of power to the two motors or to drive the vehicle at a selected speed.

Preferably, the infra-red detectors are capable of differentiating between three different locations of the signal source, so that the selected speed of the vehicle is varied depending on the detected location of the source.

The preferred receiving means constitutes another aspect of the invention and comprises four separate infra-red signal detectors arranged in a housing to detect infra-red signals transmitted from a remote source and a control signal corresponding to the detection.

Two of the signal detectors are arranged to detect infra-red signals received from directly forwardly of the vehicle in its generally intended direction of movement and have beam captures which are different but which overlap one another. In this way, receipt of an infra-red signal from the source within the beam capture of a first only of the signal detector denotes a first distance of the source from the vehicle, receipt of an infra-red signal within the beam capture of both the signal detectors denotes a second distance and receipt of an infra-red signal within the beam capture of a second only of the two signal detectors denotes a third distance.

The other two of the signal detectors are arranged to detect infra-red signals received respectively from forwardly and to the left and forwardly and to the right of the vehicle. In this way, receipt of an infra-red signal from the source within the beam capture of one of the other two signal detectors denotes a first direction of the source with respect to the vehicle and receipt of an infra-red signal within the beam capture of the other of the other two signal detectors denotes a second direction.

The vehicle also preferably includes means for disabling the electrical circuit and to disengage the electrical motors from driving relationship with the wheels.

In a particularly preferred embodiment of the invention the chassis has three wheels only and is configured as a support for a set of golf clubs. The remote source then comprises a transmitter device worn by a golfer intended to be followed by the cart.

The preferred construction of the transmitter device constitutes a further aspect of the invention and comprises a housing, power means within the housing, infra-red signal emitter means within the housing and arranged to emit a pulsed infra-red signal away from the transmitter for detection by a detector, and switch means mounted to the housing and arranged in circuit with the power means and the emitter means for activation and inactivation of the emitter means by the golfer.

The infra-red signal emitter preferably is capable of emitting infra-red pulses as pulsed pairs of predetermined pulse spacing and may be one member of a set of transmitters each capable of emitting infra-red pulses as pulsed pairs of different predetermined pulse spacings.

The transmitter usually is provided with a clip mounted to the housing which permits the transmitter to be affixed to a belt or the like of a golfer.

The remotely-controlled vehicle of the present invention, therefore, derives control signals for turn and forward speed from detected locations of the source of infra-red signals. When no signal is detected, the vehicle stops. The turn and speed are achieved by independent drive motors on the driving wheels of the device. An override is provided to disable the driving relationship between the drive motors and the wheels, so that the vehicle can be moved by hand.

The control of speed and direction in this invention is based on digital considerations, which much simplifies the electronics involved, as compared with fully analog systems used in the prior art. The use of an infrared beam is much simpler than the use of radio-frequency signals, which required the beam to be switched off to inactivate the device. The infrared beam in combination with the digitally-activated controls provide a reliable and inexpensive system for remotely-controlling a variety of wheeled-vehicles.

The remotely-controlled vehicle operates without any necessity to switch the transmitting device off and on, in contrast to prior art systems. For example, when used as a golf cart, when a golfer followed by the cart stops, the cart stops. The golfer then is able simply to move towards the cart and out of the capture beam of the infra-red detectors, while the cart remains stationary. After selecting his club, the golfer simply walks sideways and to the rear to his ball. After hitting his ball, he again moves in front of the cart and the cart will follow as the golfer walks away.

BRIEF DESCRIPTION OF DRAWINGS

FIG. 1 is a perspective view of a golf cart and transmitter combination in use;

FIG. 2 is a perspective view of a golf cart provided in accordance with one embodiment of the invention with a golf bag removed;

FIG. 3 is a perspective view of a transmitter to be worn by a golfer in the manner shown in FIG. 2;

DESCRIPTION OF PREFERRED EMBODIMENT

Figure 4:
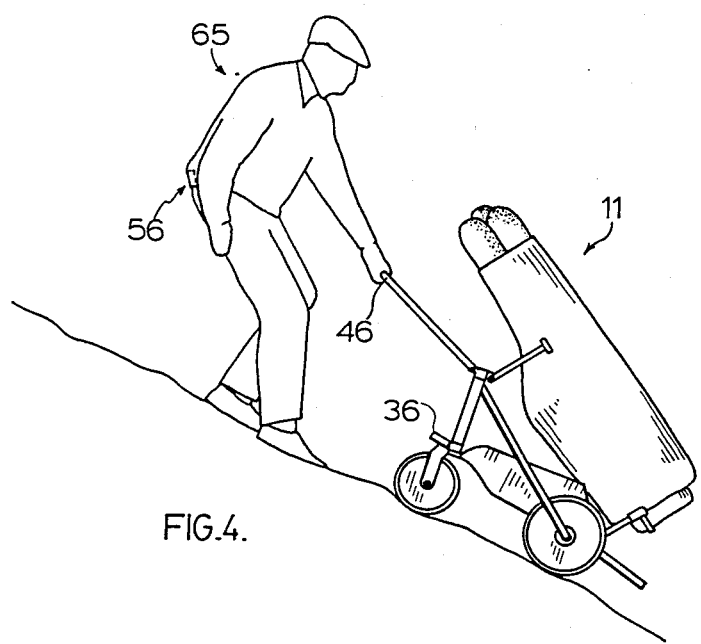
FIG. 4 illustrates operation of the golf cart of FIG. 2 by hand.

Referring to the drawings, particularly FIGS. 1 and 2, there is illustrated therein a three-wheel golf cart 10 for carrying a set of golf clubs 11. A front wheel 12 is a castering wheel which is free to rotate in any direction when pulled by hand, as described below and as shown in FIG. 4. A castering unit 13 is provided for this purpose. Rear wheels 14 and 16 are powered by independent motor and gearbox units 18 and 20 respectively. The gearboxes of the power units 18 and 20 are designed such that, when no power is applied to the respective motor, the wheel with which the power unit is associated, is locked and cannot turn. This arrangement prevents the cart 10 from rolling down hills or coasting into the operator. The gearbox may be a worm gear based unit and may be provided with clutch means to selectively disengage the gearbox from driving relationship with the wheels 14 and 16, to permit the wheels to spin freely and for the cart 10 to be pulled by an operator, if desired, such as in the case of an electronics, motor or battery failure.

The power that is applied to the motors 14 and 16 is provided by a suitably-sized battery 22 suitably mounted to the frame 24. The frame 24 is provided with rearward extensions 26 which prevent the cart 10 from tipping backwards when going up hills. The frame 24 also has a pair of straps 28 each mounted between the upward extremities of a pair of U-shaped arms 30, so as to provide a cradle for a golf bag. A cross pile 32 also is provided between the upper extremities of the lower of the pair of U-shaped arms 30 to act as a rest or stop for the golf bag.

Mounted to the front king post 34 of the cart 10 is an infra-red receiver module 36, having openings 38, 40 and 42 to permit infra-red signals to pass to detectors in the module 36. A control module and power module for the cart is housed in a housing 44 mounted to the frame 24.

A handle 46 is pivotally mounted to the upper end of the front king post 34 to permit the cart 10 to be pulled, if desired, as seen in FIG. 4. An electrical plug 48 is mounted to the handle 46 to mate with a corresponding socket 48 mounted to the king post 34 to complete the electrical circuit and enable the wheels 14 and 16 to be driven. No separate power switch is required.

The handle 46 also is connected via a declutcher cable 52 to declutcher arms 54. When the handle 46 is pivoted to the position where the plug 48 and socket mate, the declutcher cable 52 is loosened, relaxing the declutcher arms 54 and permitting the power units 18 and 20 to drivingly engage the wheels. Pivoting the handle 46 in the reverse direction opens the electrical circuit and declutches the gearboxes.

The power units 18 and 20 are powered from the battery 22 by a high current DC chopper which delivers the required voltage to unit as required to obtain the desired speed and direction. If the same voltage is fed to both power units 18 and 20, then the cart 10 moves in essentially a straight line, whereas, if the voltage to the motor driving, say, the right wheel 14 is increased and/or the voltage to the motor driving the left wheel 12 is decreased, then the vehicle turns to the left.

A housing 55 may be employed to enclose the battery 22 and controls module 44.

Referring to FIG. 3, an infra-red signal transmitter 56 comprises a box-like housing 58 and a clip 60 mounted to the rear wall of the housing 58 for attachment of the transmitter 56 to the belt or the like of a golfer. An on-off switch 60 is provided externally for activation or deactivation of the transmitter 56. The switch 62 is provided in electrical circuit with a power source, typically a rechargeable battery, located inside the housing 58 (and not shown in FIG. 3) and an infra-red signal transmitter 64.

Figure 5:
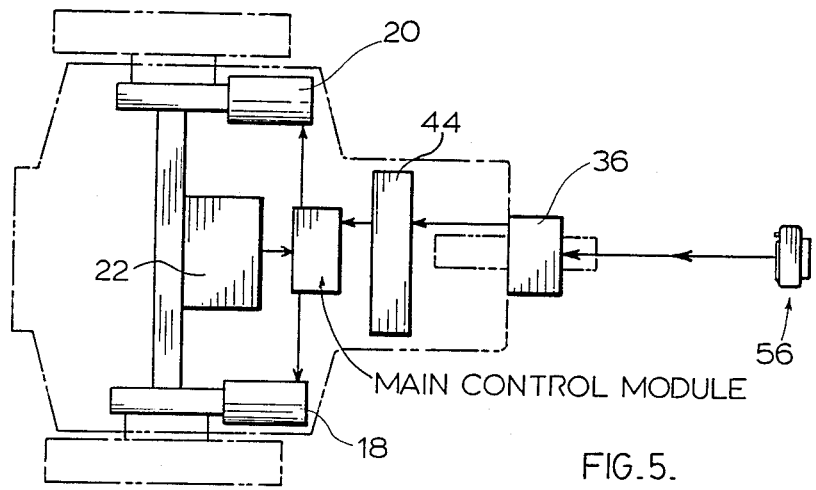
FIG. 5 is a simplified block diagram of the control system for the device of FIG. 2.

A simplified block diagram of the control of propulsion of the cart 10 is shown in FIG. 5. Infrared signals emanate as a beam from the remote transmitter 56 worn by the golfer 65 and are received at receiver 36 on the cart 10 (see also FIG. 1). The signals generated by the receiver 36 are processed by a main control module which then signals the power output module to activate the independent motors driving the wheels.

The precise circuitry of the main control module is not significant to the invention. The main control module generally includes circuitry to achieve a variety of functions, as follows:

(a) Signal Decoding:

The signal from the receiver is examined to determine if the pulse spacing is correct to represent a valid signal;

(b) Steering Signal Conditioning:

The two steering signals are examined to determine if the vehicle should turn left, turn right, or continue on course;

(c) Distance Signal Conditioning and Speed Programming:

The two distance measuring signals are examined and the proper speed command signal is generated;

(d) Speed Dynamic Compensation:

This circuit is a jerk limiter to prevent "jack rabbit" starts and provide smoother acceleration;

(e) Steering Dynamic Compensation:

These circuits provide the compensation necessary to ensure that the steering command signals are sufficient to steer the vehicle in long grass or on hills, while preventing the cart from becoming unstable on smooth level ground;

(f) DC Choppers:

Two choppers (one for each motor) accept analog command signals and provide duty cycle modulated drive signals to the power output module;

(g) Power Supplies:

These circuits accept nominal 12 volt power from the propulsion battery and provide regulated +7 and −6.2 volt power for use onboard and by the receiver module; and (h) Lower Battery Voltage Inhibit:

This circuit cuts off the power to the drive motors if the propulsion battery voltage falls below a predetermined value.

The power output module is a two channel (one left, one right) very high gain current amplifier which accepts drive signals (typically about 12 volts at 1 mA) from the main control module and can supply in excess of 100 amps to the traction motors. Dynamic braking circuits also may be included to connect a low value brake resistor across the motor terminals whenever the command voltage drops to zero.

The infra-red signal emitted by the transmitter 56 is used by the control module on the cart 10 to determine the distance and direction of the transmitter 56, as described in more detail below.

Emission of a continuous infra-red signal requires a large power source and costly infra-red emitting diodes. It is preferred, therefore, to employ a transmitter output which is a chain of very short (typically 10 microsecond) spaced-apart pulses, with typically a 20 millisecond spacing. Circuitry in the main control module reads these pulses and fills in the spaces between them to provide a continuous signal. In this manner, the control system is able to update distances and direction information up to 50 times a second.

A pulse coding scheme may be used to ensure that a particular cart responds only to its assigned transmitter and does not attempt to follow another golfer. The coding is achieved by transmitting the pulses as pairs rather than single pulses with the spacing between the two pulses in each pair determining the code.

Figure 6:
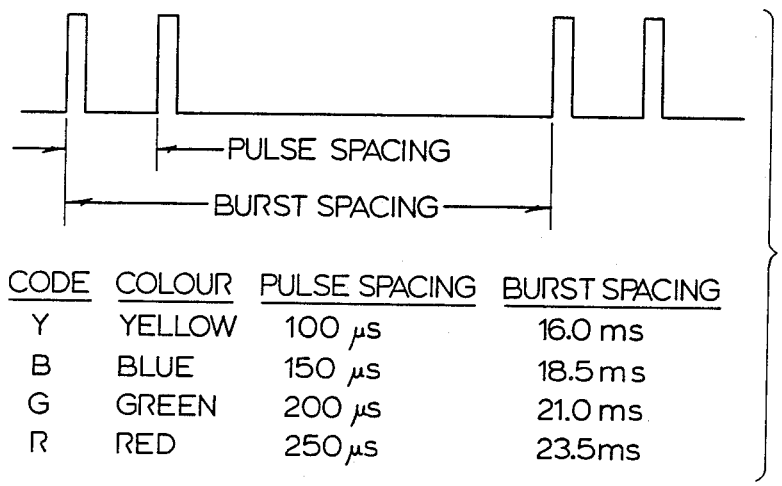
FIG. 6 illustrates a typical pattern of infra-red transmission from the transmitter of FIG. 3 and a table showing differentiation between infra-red sources.

Any number of distinct pulse separation codes may be provided. This pulse spacing is illustrated in FIG. 6, with a table showing four distinct pulse separation codes. In this illustration, the burst spacing also is made different for each code. This spacing is done only to minimize the effects of intermodulation interference when two or more transmitters are being used.

The receiver device 36 contains four virtually identical but separate infra-red receivers. Each receiver uses an infra-red photodiode to detect the infra-red signal from the transmitter 56. Multistage amplifiers usually are used to boost the signal to a level that can be used by the main control module.

Each photodiode or sensor is placed in a small infra-red proof cavity having a precisely-defined window 36, 38 or 40 to permit entry of the infra-red signal from the transmitter 56.

Figure 7:
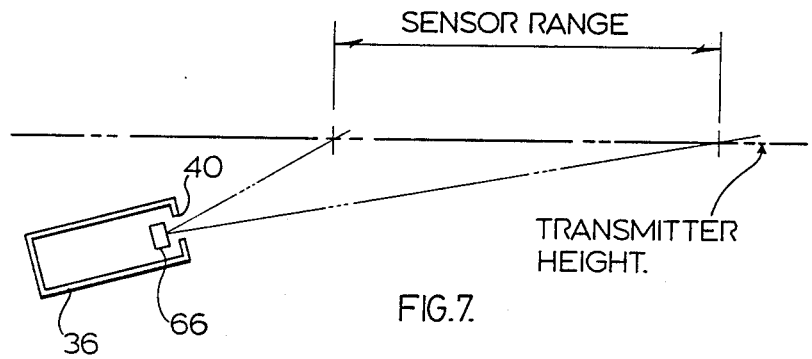
FIG. 7 illustrates distance sensing with a single infra-red sensor.
Figure 8:
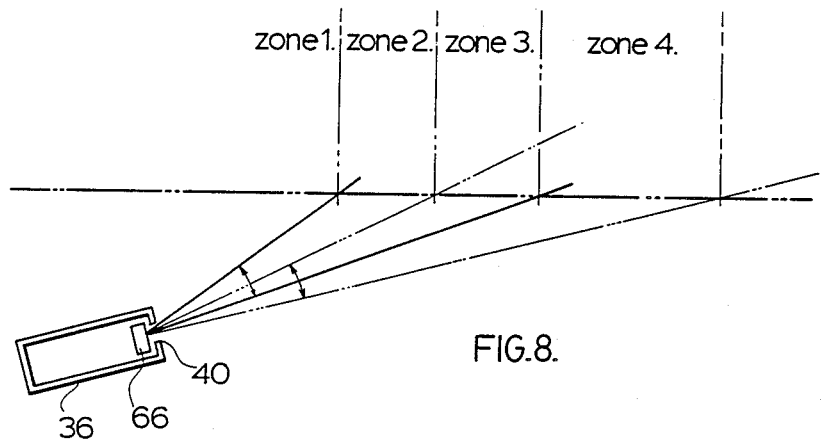
FIG. 8 illustrates distance running with two infra-red sensors.

The manner of distance sensing is illustrated in FIGS. 7 and 8. For correct speed programming, it is necessary to know the separation between the transmitter and receiver. Two infra-red sensors 66, 68 are provided, each with a defined aperture or window 40, which, in effect, defines a "capture beam" for the sensor. If the transmitter 56 is outside the capture beam, no signal reaches the sensor 66, 68. The effect of the capture beam is to define a range of transmitter distance within which the transmitter signal reaches the sensor (see FIG. 7). By using two sensors 66 and 68, two different capture beams are defined which may overlap, as seen in FIG. 8.

When the distance from the transmitter is known (within one of the four zones), the speed of the vehicle can be programmed accordingly. As shown in FIG. 8, if the transmitter is in Zone 4 (only the far beam received), the vehicle is programmed to travel at high speed. If the transmitter is closer to the receiver (Zone 3), a signal is received on both sensors, and mid speed is selected. In Zone 2, only the near sensor receives a signal and low speed is selected. In Zone 1, no signal will be received and the vehicle stops.

To understand how this system operates in actual use (see also FIG. 1), assume a golfer is walking slowly down the fairway with the vehicle following a few feet behind in the low speed mode (Zone 2). If the golfer then increases his walking speed, the vehicle initially drops back until it is in the next distance zone (Zone 3). At this point, the voltage to the motors is increased and the vehicle accelerates. If the vehicle speed then is greater than the walking speed of the golfer, the vehicle begins to catch up, moves back into Zone 2, and then slows down again.

If however, the vehicle speed is less than that of the golfer, it falls father behind, moves into distance Zone 4, and the voltage to the motor is increased again, thereby increasing the vehicle speed and allowing it to move back in Zone 3.

By this method, the cart 10 always follows the golfer 65 at an average speed essentially equal to his walking speed, but the distance the vehicle follows behind the golfer varys, depending on the walking speed. At a slow walking speed, the vehicle follows within, say, about four feet, while at a very fast walk, it may follow as much as ten feet behind the golfer. Similarly, when climbing a hill, more power is required, and the vehicle follows at a greater distance than it would on level ground.

Thus, the power applied to the traction motors is controlled as a function of the separation between the transmitter and receiver. An example of the type of distance/power program which may be used is given in the following Table 1:

TABLE 1

| Sample Distance/Speed Program | |
|---|---|
| Distance from transmitter to receiver | Power applied to traction motors |
| 0 to 4 feet | 0% |
| 4 to 6 feet | 30% |
| 6 to 8 feet | 60% |

TABLE 1-continued

Sample Distance/Speed Program

| Distance from transmitter to receiver | Power applied to traction motors |
|---|---|
| 8 to 12 feet | 100% |

Figure 9:
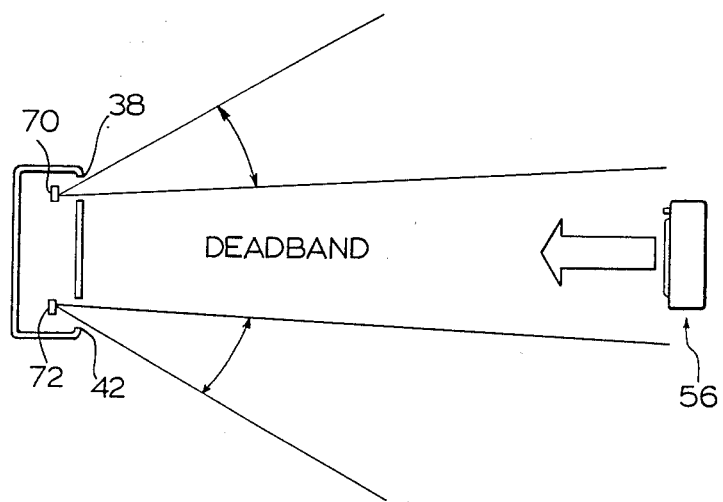
FIG. 9 illustrates direction sensing with two infra-red sensors.

The manner of sensing direction and steering is illustrated in FIG. 9. The infra-red sensors 70 and 72 are provided, each with a defined aperture or window 38 and 42, which again defines the capture beam of the sensor. One capture beam is forwardly and to the right while the other capture beam is forwardly and to the left.

The signals from the two sensors 70 and 72 are interpreted as shown in the following Table 2:

TABLE 2

| Condition | Action |
|---|---|
| 1. No signal on either sensor. | Do not turn. |
| 2. Signal on left sensor only. | Turn left. |
| 3. Signal on right sensor only. | Turn right. |
| 4. Signal on both sensors. | Do not turn. |

Condition 1 effectively forms a dead band when the receiver is aimed in the general direction of the transmitter. If the transmitter is within this deadband, no steering correction is initiated. However, if the transmitter is outside the deadband, a steering command is generated to redirect the vehicle.

In the simplified diagram of FIG. 9, the deadband is very narrow near the receiver, and widens as the distance from the receiver is increased. However, the deadband usually is almost constant in width (approximately two feet) over the entire range of normal operation, by taking the sides of the steering apertures non vertical, as seen in FIG. 2. As configured in FIG. 9, condition 4 does not exist.

Operation of the golf cart 10 is automatic and is able to stop and start without the necessity for transmission of the infra-red signals to be interrupted. As the golfer 65 walks up to his golf ball, stops, and turns around and walks towards the cart to get a club, the transmitter 56 now is out of the line of sight and capture beam of the detectors. The golfer 65 now walks sideways and rearward from the cart 10 and the cart 10 remains stationary as no detecting channel sees the transmitter. After the golfer 65 hits his ball, he replaces his club and walks away from the front of the cart 10 to allow the receiving channels to pick up the transmitter 56 again and follow the golfer 65. The stopping and restarting of the cart thus is effected without any necessity for the transmitter 56 to be switched off and on.

SUMMARY OF DISCLOSURE

In summary of this disclosure, the present invention provides a novel remotely-controlled vehicle which is able to faithfully follow an infra-red transmitting source by varying the power independently applied to a pair of drive wheels so as to turn to the left or right, accelerate or slow down. Modifications are possible within the scope of this invention.

What I claim is:

1. A remotely-controlled vehicle capable of responding to infra-red signals received from a remote source and to follow such remote source in accordance with the signals detected, which comprises:

a chassis having three wheels, two of said wheels being independently driven by separate electric motors, means for driving and controlling said wheels including means controlling the speed of said motors, whereby said vehicle may turn to the left or right by applying a differential of power to the two motors or to drive the vehicle at a selected speed, receiving means mounted to said chassis for receiving and interpreting infra-red signals from said remote source by a plurality of infra-red signal detectors, said receiving means comprising:

four separate infra-red signal detectors arranged in a housing to detect infra-red signals transmitted from a remote source and to generate a control signal corresponding to the detector, two of said signal detectors being arranged to detect infra-red signals from directly forwardly of the vehicle in its generally intended direction of movement and having beam captures which are different but overlap one with another, whereby receipt of an infra-red signal from the source within the beam capture of a first only of said two signal detectors denotes a first distance of the source from the vehicle, receipt of an infra-red signal within the beam capture of both of said signal detectors denotes a second distance and receipt of an infra-red signal within the beam capture of a second only of said two signal detectors denotes a third distance, the other two of said signal detectors being arranged to detect infra-red signals received respectively from forwardly and to the left and forwardly and to the right of the vehicle, whereby receipt of an infra-red signal from the source within the beam capture of one of said other two signal detectors denotes a first direction of the source with respect to the vehicle and receipt of an infra-red signal within the beam capture of the other of said other two signal detectors denotes a second direction, and signal processing means to generate a command signal to said driving and controlling means to cause said vehicle to move in accordance with the infra-red signals detected by said receiving means.

2. The vehicle claimed in claim 1, including means for disabling the electrical circuit and to disengage said electrical motors from driving relationship with said wheels.

3. The vehicle claimed in claim 1 wherein said chassis has three wheels and is configured as a support for a set of golf clubs and said remote source comprises a transmitter device worn by a golfer intended to be followed by the cart.

4. The vehicle claimed in claim 3 wherein said transmitter device comprises:

a housing, power means within said housing, infra-red signal emitter means within said housing and arranged to emit a pulsed infra-red signal away from the transmitter for detection by a detector, and switch means mounted to said housing and arranged in circuit with said power means and said emitter means for activation and inactivation of said emitter means.

5. The vehicle claimed in claim 4 wherein said infra-red signal emitter means is capable of emitting infra-red pulses as pulsed pairs of predetermined spacing.

6. The vehicle claimed in claim 5 wherein said transmitter is one member of a set of transmitters each capable of emitting infra-red pulses as pulsed pairs of different predetermined spacings.

7. The vehicle claimed in claim 1 wherein said signal processing means includes amplifier means in association with said plurality of infra-red signal detectors to increase the strength of the signal generated by the detectors.

* * * * *